Jan. 23, 1951 J. MERCIER Re. 23,333
STORAGE DEVICE
Original Filed May 10, 1939
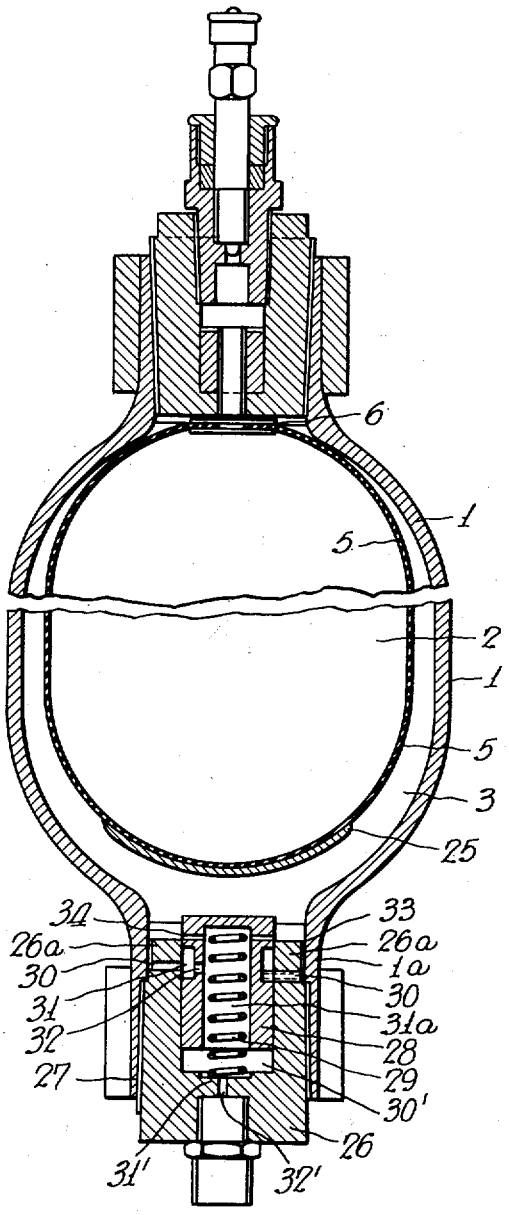
INVENTOR
Jean Mercier
BY
Dean Fairbank & Hirsch
ATTORNEYS Reissued Jan. 23, 1951

Re. 23,333

UNITED STATES PATENT OFFICE 23,333

STORAGE DEVICE

Jean Mercier, New York, N. Y.; vested in the Attorney General

Original No. 2,331,921, dated October 19, 1943, Serial No. 272,791, May 10, 1939. Application for reissue August 16, 1950, Serial No. 179,852. In France May 31, 1938

5 Claims. (Cl. 138—30)

Matter enclosed in heavy brackets [ ] appears in the original patent but forms no part of this reissue specification; matter printed in italics indicates the additions made by reissue

The present invention relates to accumulators of liquid under pressure of the type including a rigid container provided with at least one inlet and outlet conduit for the liquid, and a flexible deformable bag fixed at one end to said container and filled with gas under pressure.

The object of the present invention is to provide an accumulator of this type which is better adapted to meet the requirements of practice than those existing prior to this invention, and, in particular, better protected against possible injury of the deformable bag.

Another object of the present invention is to devise an accumulator advantageous for use on aircraft.

With [this object] *these objects* in view, according to an important feature of my invention, the orifice of the liquid conduit above-mentioned which opens into the rigid container is provided with means for preventing the bag from *extruding* [engaging] thereinto while permitting the flow of liquid into and from said conduit as long as the bag is not applied against said orifice.

Other features of the present invention will *appear* [result] from the following description of an embodiment thereof given by way of example and illustrated in the accompanying drawing.

The only figure is a diagrammatic sectional view of an accumulator according to the invention.

The drawing shows a rigid container 1 forming the outer casing of the accumulator and a flexible and advantageously elastic bag 5 provided inside this container. Bag 5 may be simply attached to the accumulator 1 at 6. It forms a continuous partition between chambers 2 and 3, thus preventing the formation of an emulsion of gas in the oil. This bag is expanded or compressed according to the variations of volume of chamber 2 under the effect of variations of the oil pressure in chamber 3. In normal conditions, the pressures are practically equal inside and outside of bag 5.

In order to prevent an excessive expansion of bag 5 with a consequent risk of bursting, in the case of a sudden drop of the oil pressure in chamber 3, means may be provided in the wall of this bag, in the form of a small orifice, of a slot, of a valve or the like, adapted to afford the escape of air from bag 5, but preventing all circulation of oil from chamber 3 into the said bag. Such means are described in my co-pending application Serial No. 229,641 [, now Patent No. 2,317,395].

In the illustrated embodiment of the present invention, which offers particular advantages by reason of its simple construction, bag 5 is secured at its upper end, at 6, to container 1, and is fitted at this point with a valve means for filling the same with gas under pressure. The lower end 25 of bag 5 is free in container 1 and [its end portion] is reinforced.

In the end of container 1 opposite to 6 is provided a port 27 for the inflow or outflow of liquid under pressure to be stored in the accumulator. The communication [across] *through* port 27 is controlled by a member 26 which closes this lower end of container 1. At its upper portion, member 26 has an axial bore *or passageway* 30′ having a floor 31′ near its outer end, said floor having an axial bore 32′ therethrough leading to the exterior of said container, and a plunger 28 is slidably mounted in said passageway, urged upwardly by a spring 29 so as to cause its upper face to project above the upper face of member 26 into container 1. *The length of plunger 28 is substantially equal to that of the axial bore 30′ so that in its extreme closed position when the lower end of plunger 28 is seated on floor 31′, the face of the plunger will be substantially flush with the upper face of member 26.* In the periphery of member 28, there is formed a groove 31 the height of which is such that, whatever be the position of plunger 28 in member 26, said groove 31 is always in communication with radial channels 30 provided in member 26. Groove 31 also communicates through radial channels 32, formed in plunger 28, with a central bore 31ᵃ provided in said plunger, which bore 31ᵃ communicates with port 27 and contains spring 29. The upper part 26ᵃ of member 26 is [engaged] *positioned* preferably with a certain play 33 in the lower portion 1ᵃ of container 1. This play may, however, be dispensed with and in this case channels 30, 31, 32 become superfluous. The upper part of plunger 28 is provided with radial channels 34 which communicate with the inside of container 1 when plunger 28 is raised, but which are closed when the latter is forced into member 26. Plunger 28 is movable in member 26 with a certain lateral play, such as $\frac{1}{10}$ mm. or the like.

The operation is as follows: When bag 5 is expanded and comes to bear against the upper surface of [member 26 and] plunger 28, it drives *the latter* [plunger 28] into member 26, against the action of spring 29 [.] *as limited by the flange at the lower end of the bore until the upper surface of said plunger 28 is substantially flush*

*with the upper surface of member 26.* The reinforced portion 25 of bag 5 [is] *will consequently be* applied against a wall, which is continuous except for the slight play between member 26 and plunger 28 and between part 26[a] and the inner wall of container 1. The said play, if any, should be so small as to avoid all damage to bag 5, even if the same be applied with considerable force.

Plunger 28 will also be forced into member 26, although bag 5 may be distant from *said plunger,* [the former] when the pressure in container 1 exceeds the pressure in conduit 27 and bore 31[a] plus the strength of spring 29. In this event, the play 33 provided between member 26 and the wall of container 1, as well as the play between member 26 and plunger 28 permit the outflow of a small supply of liquid which is sufficient to operate controls which require only a small power, such as the wing flags of an aeroplane or the like.

The normal position shown in Fig. 1, in which plunger 28 projects from member 26 and uncovers the channels 34, affords a much greater in and outflow.

*It is of course to be understood that the accumulator herein could be used at any angle, including a horizontal or inverted position and hence the end or surface of the member 26 designated as the upper surface in the position shown in Fig. 1 is referred to in some of the claims as the "inner end."*

The foregoing description is not intended to limit my invention which extends to any changes or modifications comprehended within the scope of the appended claims.

I claim:

1. An accumulator of liquid under pressure which comprises, in combination, a rigid container, at least one port for supply and discharge of liquid opening into one end of said rigid container, a flexible deformable bag in said container fixed at one point thereof to the other end of the same [and filled with gas under pressure, said bag being incapable to resist said pressure unless supported,] and valve means [,] in said port for controlling the flow of said liquid therethrough, said valve means *including a plunger mounted in said port and means normally urging the plunger to open position with the face thereof projecting above the inner end of said port, said face of said plunger* being adapted to be *substantially* flush with the [inner wall of said container] *inner end of said port to close the latter* at least when said bag is bearing [thereon.] *on said plunger.*

2. An accumulator of liquid under pressure which comprises, in combination, a rigid container, at least one port for supply and discharge of liquid opening into one end of said rigid container, a flexible deformable bag in said container fixed at one point thereof to the other end of the same [and filled with gas under pressure, said bag being incapable to resist said pressure unless supported,] and valve means inserted into said port, said valve means including a member fixed to the container and forming the valve seat, a movable valve element adapted to cooperate with said seat so as either to project into said container or to be driven into said fixed member, in flush relation to the [inner] *upper* face thereof, and *resilient* [elastic] means for urging said movable valve element toward the first mentioned position thereof, in which it affords communication across said port between the inside of said rigid container and the outside, said valve means being mounted with a certain play in said port so as to permit a small flow of said liquid even when the movable valve element is in the closed position.

*3. An accumulator of liquid under pressure which comprises, in combination, a rigid container, at least one port for supply and discharge of liquid opening into one end of said rigid container, a flexible deformable bag in said container fixed at one point thereof to the other end of the same and valve means in said port for controlling the flow of such liquid therethrough, said valve means including a member in said port having a passageway longitudinally therethrough, a plunger in said passageway controlling the latter and means normally urging the plunger to open position with the face thereof projecting beyond the inner end of said member, said face of said plunger being adapted to be substantially flush with the inner end of said member to close the passageway at least when said bag is bearing on said plunger.*

*4. The combination set forth in claim 3 in which said passageway has a floor near the outer end of said member and the plunger is substantially the length of the passageway from said floor to the inner end of said member to limit the inward movement of said plunger.*

*5. An accumulator of liquid under pressure which comprises, in combination, a rigid container, at least one port for supply and discharge of liquid opening into one end of said rigid container, a flexible deformable bag in said container fixed at one point thereof to the other end of the same and valve means in said port for controlling the flow of such liquid therethrough, said valve means including a member in said port having a passageway therethrough, a plunger in said passageways controlling the latter and means normally urging the plunger to open position with the face thereof projecting beyond the inner end of said member, said face of said plunger being adapted to be substantially flush with the inner end of said member to close said passageway at least when said bag is bearing on said plunger.*

JEAN MERCIER.

REFERENCES CITED

The following references are of record in the file of this patent or the original patent:

UNITED STATES PATENTS

| Number | Name | Date |
|---|---|---|
| 381,731 | Walker | Apr. 24, 1888 |
| 841,791 | Lemp | Jan. 22, 1907 |
| 1,025,222 | Wallace | May 7, 1912 |
| 2,256,835 | Mercier | Sept. 23, 1941 |

FOREIGN PATENTS

| Number | Country | Date |
|---|---|---|
| 5,796 | Great Britain | May 12, 1885 |
| 817,199 | France | Aug. 27, 1937 |
| 48,012 | France | Oct. 16, 1937 |